United States Patent [19]
Umeda

[11] Patent Number: 5,805,573
[45] Date of Patent: Sep. 8, 1998

[54] SATELLITE COMMUNICATION SYSTEM WITH VARIABLE NUMBER OF SATELLITE COMMUNICATION CHANNELS

[75] Inventor: Kenji Umeda, Tokyo, Japan

[73] Assignee: NEC Corporation, Tokyo, Japan

[21] Appl. No.: 518,295

[22] Filed: Aug. 15, 1995

[30] Foreign Application Priority Data

Aug. 15, 1994 [JP] Japan ..................................... 6-191392

[51] Int. Cl.⁶ ....................................................... H04J 3/14
[52] U.S. Cl. ........................... 370/321; 370/436; 370/468; 370/476
[58] Field of Search .................................... 370/229, 232, 370/233, 234, 230, 280, 315, 316, 310, 321, 326, 345, 347, 431, 432, 433, 437, 442, 458, 465, 468, 480, 496, 521, 330, 436, 478, 319, 252, 445, 447; 445/12.1, 13.1, 69, 70, 71, 73, 113, 150.1, 151.1, 179.1, 52.2; 379/57, 58, 59, 60

[56] References Cited

U.S. PATENT DOCUMENTS

| | | |
|---|---|---|
| 4,616,108 | 10/1986 | Yamaguchi et al. ....................... 379/58 |
| 4,736,371 | 4/1988 | Tejima et al. . |
| 4,870,408 | 9/1989 | Zdunek et al. ........................... 370/341 |
| 4,965,851 | 10/1990 | Tejima .................................... 455/52.2 |
| 4,979,170 | 12/1990 | Gilhousen et al. ..................... 455/12.1 |
| 5,436,960 | 7/1995 | Campana, Jr. et al. ................... 379/58 |
| 5,491,469 | 2/1996 | Schwendeman ................... 340/825.04 |

OTHER PUBLICATIONS

Akira Fujii et al, "VSAT System (2): AA/TDMA (Adaptive Assignment TDMA) for the VSAT Networks", *NEC Research & Development*, No. 89, Apr. 1988, pp. 8–15.

*Primary Examiner*—Wellington Chin
*Assistant Examiner*—Huy D. Vu
*Attorney, Agent, or Firm*—Sughrue, Mion, Zinn, Macpeak & Seas, PLLC

[57] ABSTRACT

A central station is connected to a plurality of remote stations through in-bound channels and out-bound channels. Data is transmitted from the respective remote stations to the central station through the in-bound channels and data is transmitted from the central station to all of the remote stations through the out-bound channels. Possibility of data transmission delay is reduced by changing the number of either or both of the in-bound channels and the out-bound channels according to a variation of amount of data transmitted/received between the remote statios and the central station.

18 Claims, 10 Drawing Sheets

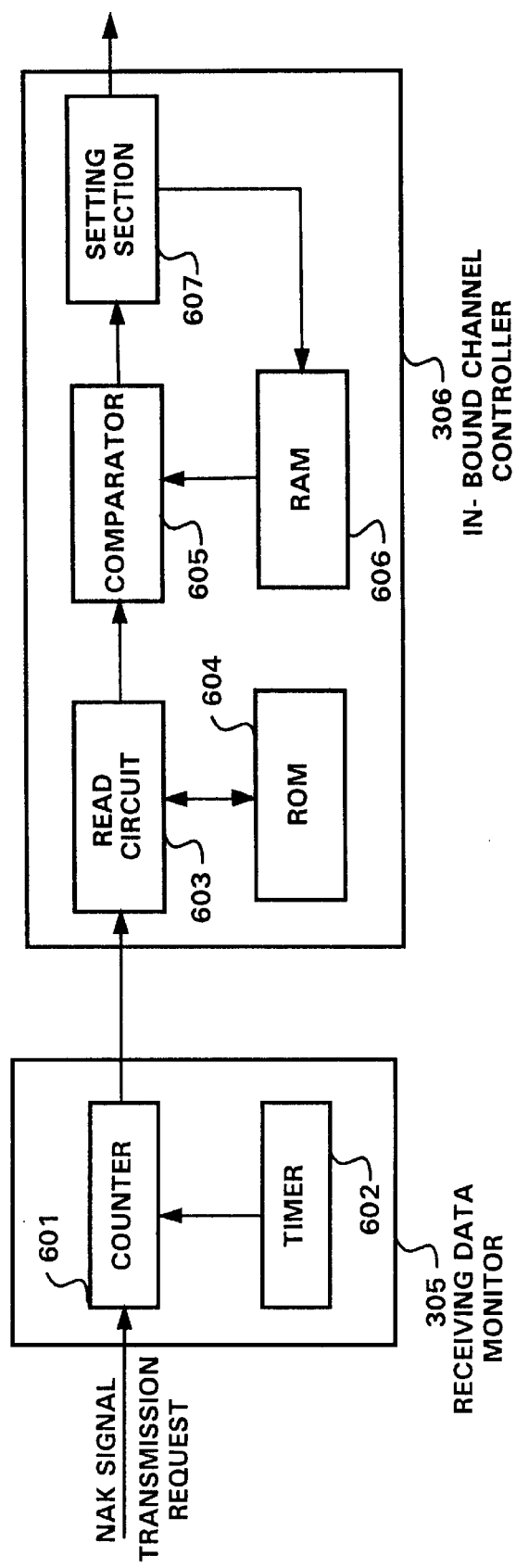

FIG.2C

| ADDRESS | THE NUMBER OF IN-BOUND CIRCUITS |
|---|---|
| 00000 | 1 |
| 00001 | 1 |
| - | . |
| - | . |
| - | . |
| - | . |
| - | . |
| - | . |
| - | . |
| - | . |
| - | . |
| - | . |
| - | . |
| - | . |
| FFFFF | 10 |
| FFFFF | 10 |

SATELLITE COMMUNICATION SYSTEM WITH VARIABLE NUMBER OF SATELLITE COMMUNICATION CHANNELS

BACKGROUND OF THE INVENTION

1. Field of the Invention

The present invention relates to a satellite communication system for performing a communication between a central earth station and a plurality of remote earth stations through satellite communication channels and, particularly, to a satellite communication system capable of performing a smooth communication by reducing transmission delay of data by changing the number of satellite communication channels correspondingly to a variation of amount of data transmitted through the channels.

2. Description of the Related Art

In general, a worldwide computer-use communication system such as an automatic cash handling system for banks, a stock trading system for stock companies and a financial credit-card authentication system includes networks of communication channels between a central earth station (referred to as "central station", hereinafter) and a plurality of remote earth stations (referred to as "remote stations", hereinafter) as infrastructure. In such system, a communication is performed between a plurality of terminals connected to these remote stations and a host computer connected to the central station. The respective remote stations transmit data to only the central station on in-bound channels through a satellite. A reply to the transmission of data from the remote stations to the central station is transmitted from the central station to all of the remote stations on out-bound channels. The respective remote stations extract only data designated to their terminals from the reply data from the central station and transfer them to their terminals.

When a communication from the remote stations to the central station is performed, each remote station transmits data to the central station by using at least one of a plurality of time slots obtained by dividing one frame time. Access of the respective remote stations to the time slots is generally performed by the fixed access system, the random access system or the time slot reservation system. These three systems have merits and demerits in views of transmission delay of transmitted data and effective utilization of the satellite communication channel. A system which is a combination of the random access system and the time slot reservation system is disclosed in U.S. Pat. No. 4,736,371, assigned to the same assignee of the present application.

The system disclosed in U.S. Pat. No. 4,736,371 restricts the frequency of occurrence of data collision by inhibiting data transmission of the random access system when a amount of short data transmission from the respective remote stations to the central station is increased. Further, this system can reduce transmission delay caused by re-transmission, etc., of short data collided in a same time slot. Therefore, this system is suitable when an amount of data transmitted from the respective remote stations to the central station varies substantially.

Further, in this system, when the amount variation of data transmitted from respective remote stations substantially exceeds a predictable variation range of data for some accidental reason, the frequency of data collision may increase, resulting in a problem that a very large data transmission delay due to re-transmission of collided data occurs.

An conventional satellite communication system which employs the combination of the above-mentioned random access system and the time slot reservation system is disclosed in NEC Research & Development, No. 89, "VSAT System (2): AA/TDMA (Adaptive Assignment TDMA) for the VSAT Networks", (April 1988).

In this system, congestion of data transmission through in-bound channels is avoided by expanding an interval between times in which the remote stations send transmission signals to a central station through the in-bound channels.

In this system, however, when an amount of data is so large that the number of in-bound channels which was set according to a data amount predicted initially is not enough, data transmitted from the respective remote stations may collide repeatedly. Therefore, in such case, there is a very large data transmission delay due to re-transmission of collided data. In this conventional satellite communication system, it is impossible to employ other measures than the expansion of transmission time interval of data from the remote stations and, consequently, there may be a case where data transmission from the remote stations has to be stopped.

Further, in the same satellite communication system, the number of in-bound channels and the number of out-bound channels are preset by predicting the maximum data amount on a communication line. Since, therefore, the communication is performed through the preset number of in-bound channels and the preset number of out-bound channels even under condition that an amount of data under transmission is very small in such as night time, there are many useless channels, causing the efficiency of utilization of the satellite channels to be very low.

SUMMARY OF THE INVENTION

An object of the present invention is to provide a communication system capable of reducing data transmission delay by changing the number of communication channels between a plurality of remote stations and a central station corresponding to a large variation of amount of data transmitted from the remote stations to the central station, which exceeds an estimated variation.

Particularly, in a communication system in which a plurality of remote stations are connected to a central station through at least one in-bound channel and at least one out-bound channel data is transmitted from the respective remote stations to the central station through the in-bound channel and data is transmitted from the central station to the respective remote stations through the out-bound channel, an object of the present invention is to provide a satellite communication system capable of reducing data transmission delay and realizing a smooth communication by changing the number of communication circuits between the remote stations and the central station corresponding to a large variation of amount of data transmitted from the remote stations to the central station, which exceeds the estimated variation.

Another object of the present invention is to provide a satellite communication system capable of utilizing satellite communication channels effectively by changing the number of the channels according to utilization time and/or utilization state thereof.

A further object of the present invention is to provide a satellite communication system capable of changing the number of in-bound channels and the number of out-bound channels and setting carrier frequencies of these channels.

In order to achieve the above-mentioned objects, a satellite communication system according to the present invention is composed of a plurality of remote stations and a central station connected to the respective remote stations through satellite channels. The remote stations transmit data to the central station through at least one of first channel of the satellite channels. The central station transmits same data to all of the remote stations through at least one second channel of the satellite channels. In an aspect of the present invention, the central station comprises a detector for detecting an amount of data transmitted from the remote stations to the central station and a changing device for changing the number of the first circuits according to the detected data amount.

In another aspect of the present invention, the central station comprises a detector for detecting an amount of data transmitted from the remote stations to the central station and a changing device for changing the number of the second channels according to the detected data amount.

Particularly, the central station of the satellite communication system according to the present invention comprises a receiver for obtaining a first data by demodulating signals from the remote stations and a first monitor for monitoring a data amount of the first data thus received. The central station further comprises a first circuit setting device for determining the number of the first channels and carrier frequencies of the respective channels and outputting a first control data indicative of an information of the channel number and carrier frequencies and a transmitter for transmitting the first control data to the remote stations. On the other hand, each remote station comprises a receiver for obtaining a second data by demodulating the signal transmitted from the central station and a separator for separating the first control data from the second data. Further, each remote station comprises a transmitter for transmitting data transmitted from at least one of first terminals connected to the respective remote stations to the central station and a first channel controller for controlling the first channel used by the transmitter on the basis of the first control data separated by the separator.

With such construction as mentioned above, it is possible to restrict occurrence of transmission delay correspondingly to a variation of amount of the data transmitted/received through the satellite communication channel.

Further, the present invention can be applied to a satellite communication system having a plurality of very small aperture terminals (VSAT's) and a central earth station (HUB) connected thereto through at least one in-bound channel and at least one out-bound channel. Data is transmitted from each of the VSAT's to the HUB through the in-bound channel and data is transmitted from the HUB to all of the VSAT's through the out-bound channels. The number of either or both of the in-bound channels and the out-bound channels and their carrier frequencies are set according to a variation of amount of data transmitted/received between the VSAT's and the HUB. The HUB and the VSAT's change the current number of either or both of the in-bound channels and the out-bound channels which are used to transmit/receive the data and their frequencies to the number of channels and their frequencies of either or both of the in-bound channel and the out-bound channel thus set.

Detection of the amount of data transmitted/received between the plurality of VSAT's and the HUB is performed by detecting the number of collisions of the data transmitted from one VSAT to the HUB with the data transmitted from other VSAT's to the HUB within the same time slot and then detecting the number of data collisions occurred within a predetermined time.

Another detection of the data amount is to detect an accumulation of length of data transmitted/received within a predetermined time.

When the data amount thus detected is larger than a predetermined value, the number of the in-bound or out-bound channels is increased and, when the data amount thus detected is smaller than the predetermined value, the number of the in-bound or out-bound channels is reduced.

BRIEF DESCRIPTION OF THE DRAWINGS

The above and other objects, features and advantages of the present invention will become more apparent from the following detailed description taken with the accompanying drawings in which:

FIG. 2B is a block diagram showing a construction of a receiving data monitor section and an in-bound channel control section of the HUB shown in FIG. 2A;

FIG. 2C shows data stored in an ROM of the construction shown in FIG. 2B;

DETAILED DESCRIPTION

A preferred embodiment of the present invention will be described with reference to FIGS. 1 to 6.

The embodiment relates to a satellite communication system wherein a plurality of remote earth stations, that is, very small aperture terminals (VSAT's), are connected to a central earth station (HUB) through in-bound channels and an out-bound channel, each VSAT transmits data to the HUB through the in-bound channels and the HUB transmits data to all of the VSAT's through the out-bound channel. Particularly, the embodiment relates to a satellite communication system capable of reducing the frequency of occurrence of data transmission delay by changing the predetermined number of either one or both of the in-bound and out-bound channels according to a variation of amount of data transmitted/received between the VSAT's and HUB.

Figure 1:
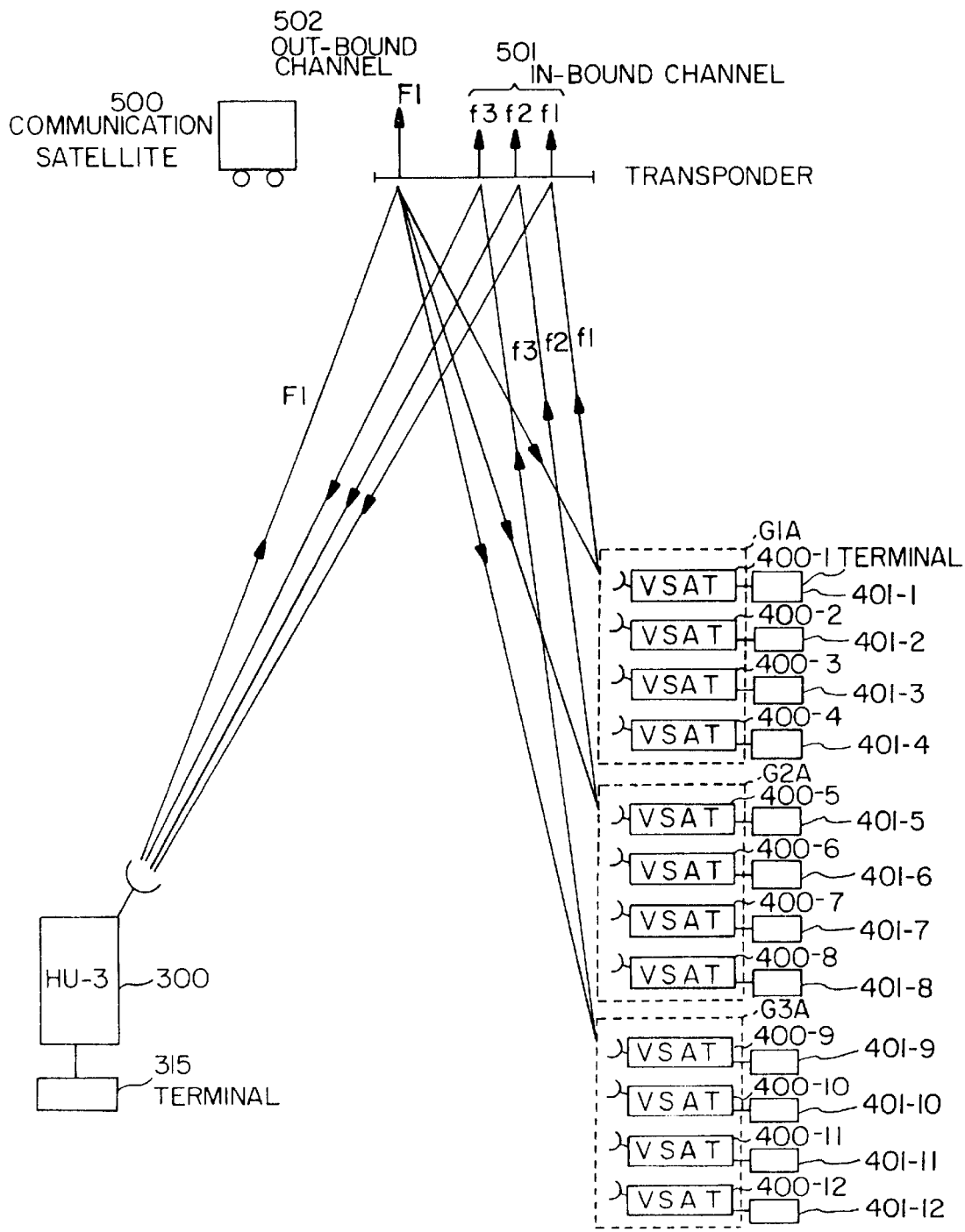
FIG. 1 shows a construction of a communication system according to the present invention, schematically.

Referring to FIG. 1, the satellite communication system of the present invention includes a single HUB 300 and a plurality of VSAT's 400-1 to 400-12 connected to the HUB 300 through a satellite communication channels, that is, in-bound channels 501 and an out-bound channel 502, using a communication satellite 500 as a transponder. The respective VAST's 400-1 to 400-12 transmit data to only the HUB 300 in time division multiple access (TDMA) through the in-bound channels having carrier frequencies f1, f2 and f3. The HUB 300 transmits an identical data to all of the VSAT's 400-1 to 400-12 through the out-bound channel 502 having carrier frequency F1. Terminals 401-1 to 401-12 are connected to the respective VSAT's 400-1 to 400-12. The terminals 401-1 to 401-12 generate data to be transmitted in a time slot through the in-bound channels by the time slot reservation system or the random access system according to data length of the data to be transmitted. On the basis of the data length of the data generated by the terminals 401-1 to 401-12, the access system for sending the transmission data is determined within each of the VSAT's 400-1 to 400-12. Further, depending upon utilization state of the satellite communication system, it is possible to connect terminals which generate data to be transmitted within time slots of the in-bound channels by the fixed assignment access system to the respective VSAT's 400-1 to 400-12.

Figure 2A:
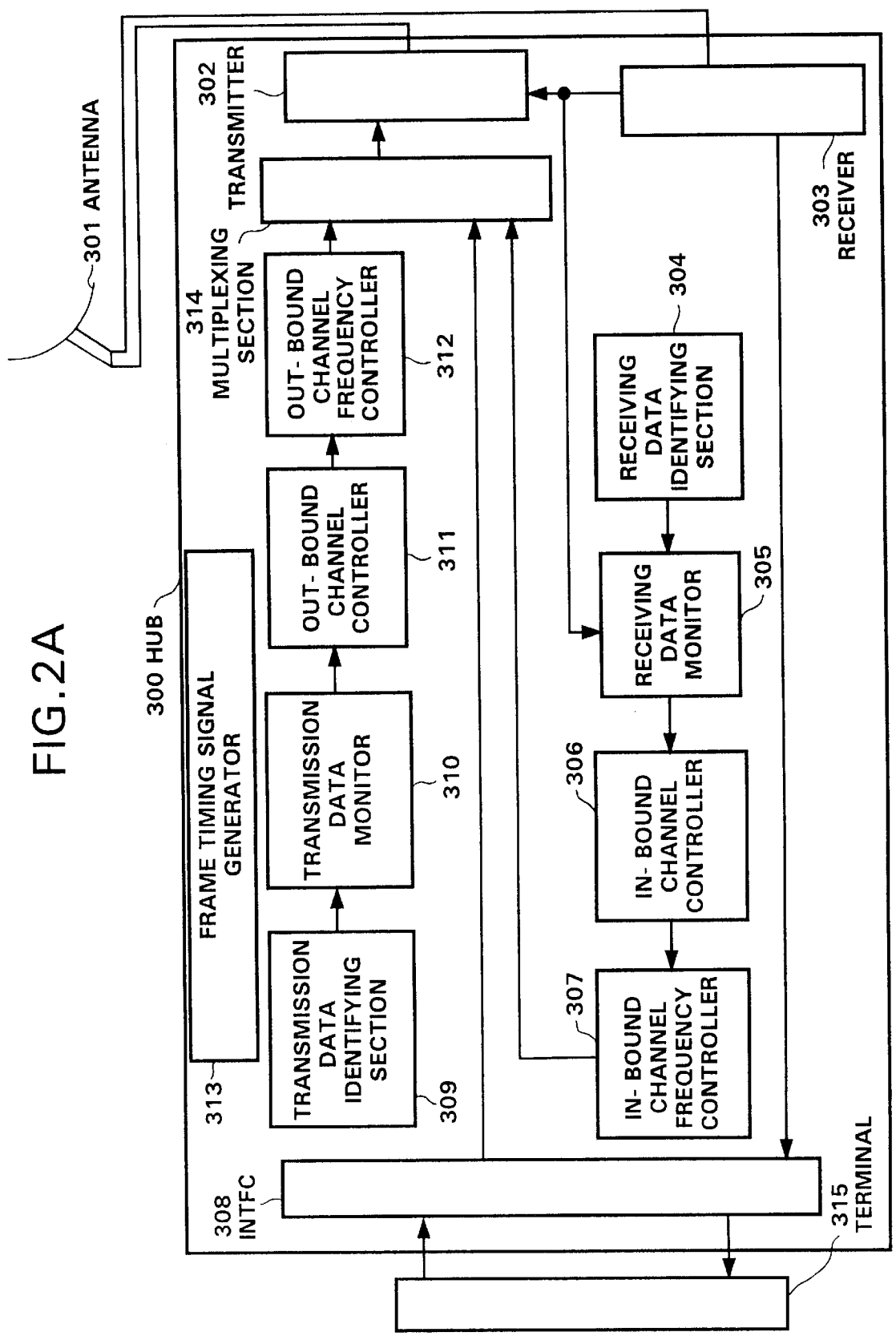
FIG. 2A is a block diagram showing a construction of a central earth station (HUB) of the communication system according to the present invention.

Referring to FIG. 2A which shows a construction of the HUB 300, data transmitted from each of the VSAT's 400-1 to 400-12 is input to a receiver 303 of the HUB 300 through an antenna 301 and demodulated thereby. A receiving data identifying section 304 determines the VSAT which transmits the data demodulated by the receiver 303. When the receiver 303 of the HUB 300 receives the data from any of the VSAT's 400-1 to 400-12 normally, the HUB 300 sends a positive acknowledgement (ACK) signal to the VSAT through a transmitter 302 and, when the receiver 303 of the HUB 300 can not receive the data from any of the VSAT's 400-1 to 400-12, the HUB 300 sends a negative acknowledgement (NAK) signal to the VSAT through the transmitter 302. A receiving data monitor 305 of the HUB 300 detects the number of data collisions occurred in each in-bound channel having a specific frequency, on the basis of the identification supplied from the receiving data identifying section 304 and NAK signal transmission requests output from the receiver 303. The receiving data monitor 305 supplies the number of collisions to an in-bound channel controller 306 as a data amount of the receiving data. The in-bound channel controller 306 determines generation of traffic congestion in every in-bound channel on the basis of the data amount supplied from the receiving data monitor 305. When traffic congestion occurs in the in-bound channel, the in-bound channel controller 306 sets the number of in-bound channels necessary to avoid the congestion.

Now, the operations of the receiving data monitor 305 and the in-bound channel controller 306 will be described in detail with reference to FIG. 2A together with FIG. 2B which shows details of the receiving data monitor 305 and the in-bound channel controller 306.

The receiving data monitor 305 includes a counter 601 and a timer 602. The NAK signal transmission requests from the receiver 303 are counted by the counter 601. That is, the counter 601 counts the number of NAK signals to be transmitted from the HUB 300 to the VSATs 400-1 to 400-12. The timer 602 outputs a reset signal to the counter 601 every predetermined time, for example, every 5 seconds. The counter 601 supplies the number of the NAK signals counted within the predetermined time to the in-bound channel controller 306 every reception of the reset signal and resets the count. As mentioned, the receiving data monitor 305 detects the number of the NAK signal transmission requests generated by the receiver 303 within a preset time, that is, the number of data re-transmission from the VSAT's 400-1 to 400-12 within the constant time as the amount of data transmitted from the VSAT's 400-1 to 400-12 to the HUB 300.

The in-bound channel controller 306 includes 603, an ROM 604, a comparator 605, an RAM 606 and a setting section 607. The read circuit 603 converts the data amount transmitted from the receiving data monitor 305 into a predetermined address information and reads data stored in that address of the ROM 604. The ROM 604 stores, in every predetermined address thereof, a data indicative of the number of in-bound channels which is optimum when a communication is performed with a data amount corresponding to that address as shown in FIG. 2C. Incidentally, the optimum number of in-bound channels corresponding to the data amount is empirically obtained. In this manner, the read circuit 603 reads the optimum number of in-bound channels corresponding to the amount of data transmitted from the receiving data monitor 305. The optimum number of in-bound channels thus read out from the ROM 604 by the read circuit 603 is supplied to the comparator 605. The comparator 605 compares the current number of in-bound channels stored in the RAM 606 with the optimum number of in-bound channels which is supplied from the read circuit 603. When these are different from each other, it is judged that the current number of in-bound channels is inadequate. On the other hand, these numbers are the same, it is judged that the current number of in-bound channels is adequate. The setting section 607 sets the number of in-bound channels according to the comparison result of the comparator 605. That is, the setting section 607 changes the current number of in-bound channels to the optimum number of in-bound channels supplied from the read circuit 603 when the comparator 605 decides that the current number of in-bound channels is inadequate. When the comparator 605 decides that the current number of in-bound channels is adequate, the setting section 607 keeps the current number of in-bound channels unchanged. Furthermore, the setting section 607 stores the number of in-bound channels in the RAM 606, when the number of in-bound channels is changed. The in-bound channel controller 306 supplies the number of in-bound channels thus set by the setting section 607 to an in-bound channel frequency controller 307.

Returning to FIG. 2A, the in-bound channel frequency controller 307 sets frequencies of in-bound channels to be added, according to the number of in-bound channels informed by the in-bound channel controller 306. Further, the in-bound channel frequency controller 307 determines frequencies of the in-bound channels to be used by the respective VSAT's 400-1 to 400-12 and outputs to a multiplexing section 314 a first control data containing an information as to in-bound channel frequencies to be used by the respective VSAT's 400-1 to 400-12.

When an interface circuit (INTFC) 308 receives data transmitted from the respective VSAT's 400-1 to 400-12, the INTFC 308 outputs the data which is demodulated by the receiver 303 to a terminal 315. Further, when data is to be transmitted from the terminal 315 to all of the VSAT's 400-1 to 400-12, the INTFC 308 outputs the data from the terminal 315 to a multiplexing section 314 and to a transmission data identifying section 309. The transmission data identifying section 309 identifies at least one VSAT's 400-1 to 400-12 to which the data is to be transmitted. A transmission data monitor 310 monitors an amount of the data. That is, the transmission data monitor 310 detects a total length of data generated in the terminal 315 within a unit time as the amount of data. An out-bound channel controller 311 judges whether or not the current number of out-bound channels is adequate for the amount of the transmission data from the terminal 315 which is detected by the transmission data monitor 310. When it is judged by the transmission data monitor 310 that the current number of out-bound channels is inadequate, the out-bound channel controller 311 determines the number of out-bound channels necessary for avoidance of traffic congestion in the out-bound channels and notifies the number to an out-bound channel frequency controller 312. The out-bound channel controller.311 may be realized by using a similar circuit construction to that of the in-bound channel controller 306 shown in FIG. 2B.

The out-bound channel frequency controller 312 sets frequencies of the out-bound channels to be added, according to the number of out-bound channels notified by the out-bound channel controller 311. Further, the out-bound channel frequency controller 312 determines frequencies of the out-bound channels to be used by the respective VSAT's 400-1 to 400-12 and outputs to the multiplexing section 314 a second control data containing an information as to in-bound channel frequencies to be used by the respective VSAT's 400-1 to 400-12.

Figure 2D:
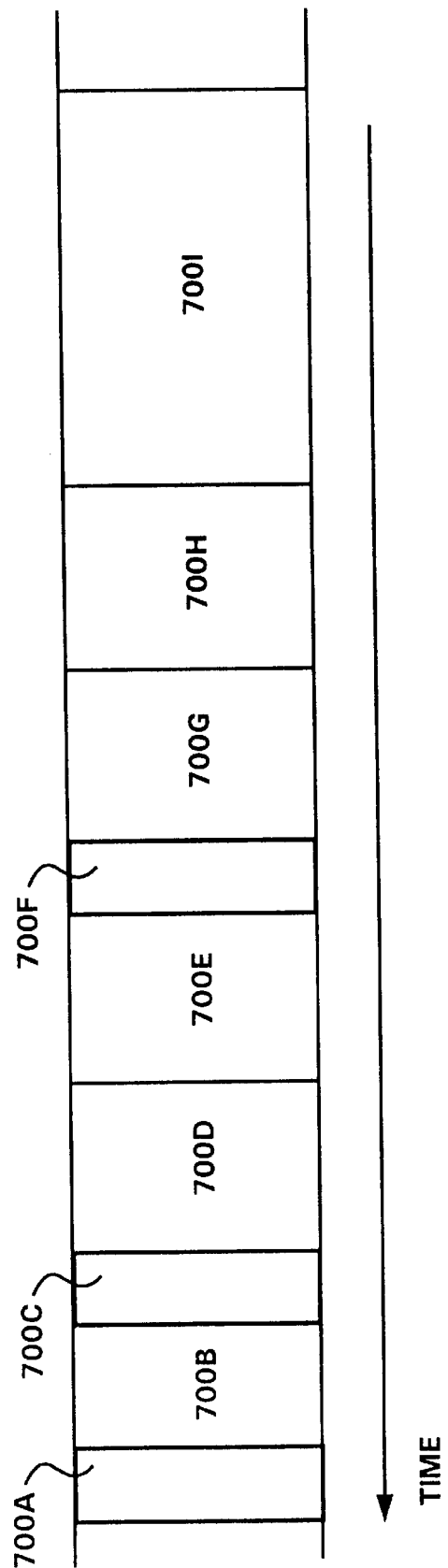
FIG. 2D shows a frame format of an out-bound signal transmitted from the HUB to very small aperture terminals (VSATs) in FIG. 2A.

The multiplexing section 314 multiplexes the transmission data from the INTFC 308, the first control data from the in-bound channel frequency controller 307, the second control data from the out-bound channel frequency controller 312 and a frame timing signal supplied from a frame timing signal generator 313 and sends a resultant multiplexed signal to the transmitter 302. A format of the multiplexed signal is constructed with, for example, 9 blocks 700A to 700I as shown in FIG. 2D. A UNIQUE WORD block 700A is a reference indicating a position of a time slot of the in-bound channel. A block 700B is a frame timing signal portion. A first congestion judge block 700C is filled with "1" or "0" to indicate a traffic condition of the circuit judged by the in-bound channel controller 306. That is, when the current number of in-bound channels is inadequate for the detected amount of data transmitted from the respective VSAT's 400-1 to 400-12 to the HUB 300, which is the number of NAK signal transmission requests and hence the number of data collisions, the first congestion judge block 700C is filled with "1". When there is no need of changing the current number of in-bound channels, it is filled with "0". A data indicative of the number of in-bound channels set by the in-bound channel controller 306 is put in an in-bound channel number transmission block 700D. The first control data which indicates carrier frequencies of the in-bound channels assigned by the in-bound channel frequency controller 307 to the respective VSAT's 400-1 to 400-12 is put in an in-bound frequency transmission block 700E. A second congestion judge block 700F is filled with "1" when a congestion is detected by the out-bound channel controller 311 and otherwise with "0". A data indicative of the number of out-bound channels set by the out-bound channel controller 311 is put in an out-bound channel number transmission block 700G. The second control data which indicates frequencies of the out-bound channels assigned by the out-bound channel frequency controller 312 to the respective VSAT's 400-1 to 400-12 is put in an out-bound frequency transmission block 700H. A block 700I is for a user data.

Returning to FIG. 2A, the transmitter 302 modulates the multiplexed signal from the multiplexing section 314 and transmits it to all of the VSAT's 400-1 to 400-12 on the out-bound channels through the antenna 301.

Although, in this case, the receiving data monitor 305 detects the amount of data transmitted from the VSAT through the in-bound channel by monitoring the number of occurrence of NAK signal transmission requests supplied from the receiver 303, it is possible to monitor the length of data identified by the receiving data identifying section 304 similarly to the processing in the transmission data monitor 310.

Figure 3:
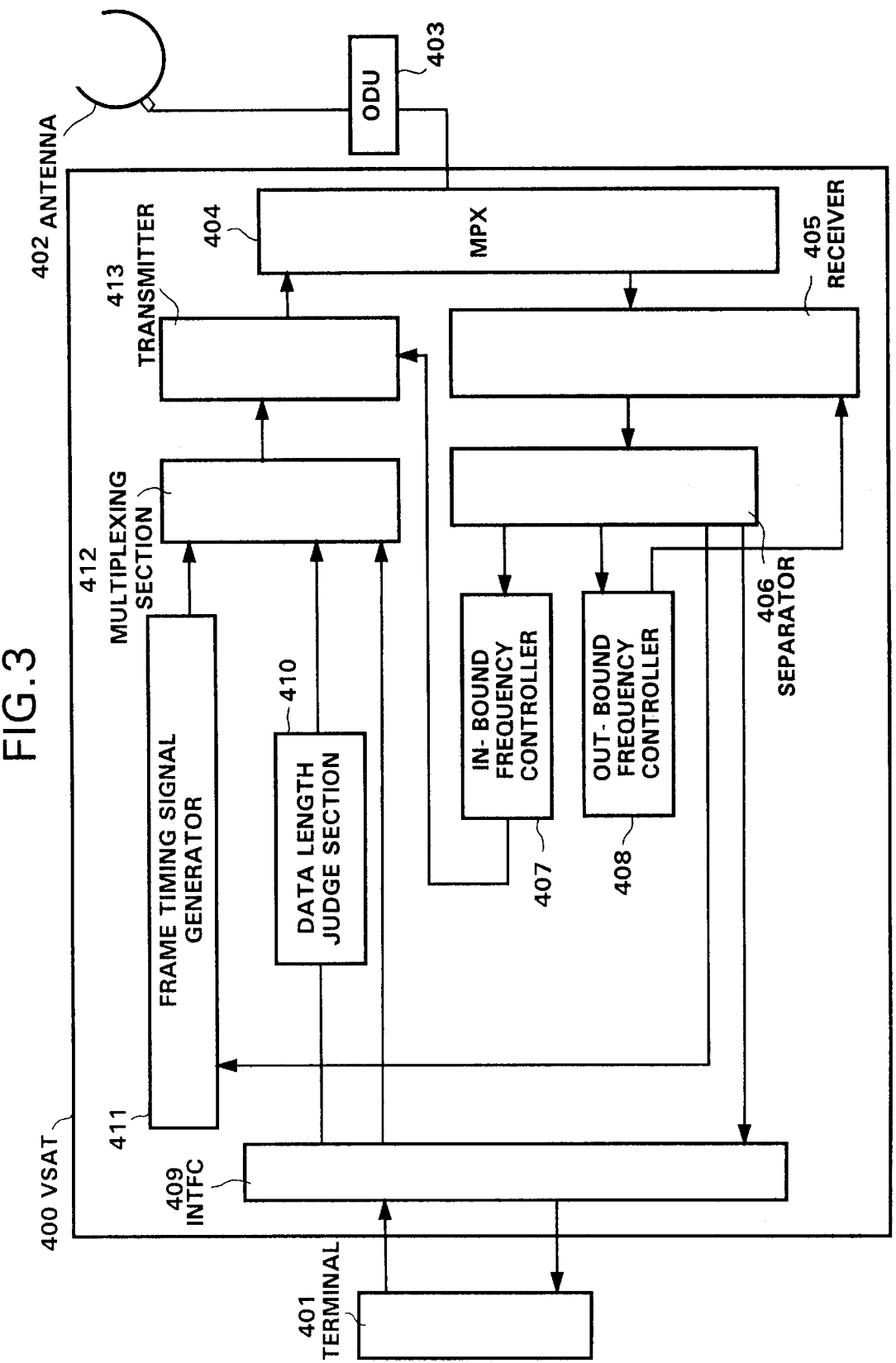
FIG. 3 is a block diagram of the VSAT of the communication system according to the present invention.

FIG. 3 shows a construction of the VSAT 400 of the satellite communication system of the present invention. The VSAT 400 includes a terminal 401 connected thereto through an interface circuit (INTFC) 409. The terminal 401 generates data to be transmitted in the time slot of the in-bound channel by the time slot reservation system or the random access system according to the length of data to be transmitted. Although not shown, it is possible to connect a terminal for generating data to be transmitted in the time slot of the in-bound channel by the fixed assignment access system to the VSAT 400.

A receiver 405 extracts data from the out-bound signal supplied from the HUB 300 through an antenna 402, an out door unit (ODU) 403 and a multiplexer (MPX) 404 and demodulates the data. A separator 406 separates, from the demodulated data, a communication data from the terminal 315 of the HUB 300, the first control data from the in-bound channel frequency controller 307 of the HUB 300 and the second control data from the out-bound channel frequency controller 312 of the HUB 300.

The INTFC 409 supplies the communication data extracted by the separator 406 to the terminal 401. The data sent from the terminal 401 through the INTFC 409 is supplied to a data length judge section 410. The data length judge section 410 detects the length of data sent from the terminal 401 and judges, on the basis of the detected data length, whether the data from the terminal 401 is to be transmitted in the time slot of the in-bound channel by the time slot reservation system or the random access system. The multiplexing section 412 multiplexes a frame timing signal output from a frame timing signal generator 411 and the data sent from the terminal 401 in a reserved time slot or an arbitrary time slot on the basis of the result of judgement in the data length judge section 410 and supplies a resultant multiplexed signal to a transmitter 413.

An in-bound frequency controller 407 transmits the frequency of the in-bound circuit assigned by the HUB 300 to the transmitter 413 according to the first control data from the separator 406. An out-bound circuit frequency controller 408 transmits the frequency of the out-bound circuit assigned by the HUB 300 to the receiver 405 according to the second control data from the separator 406.

The transmitter 413 modulates the multiplexed signal from the multiplexing section 412 according to a predetermined modulation system and sets the in-bound frequency to the frequency supplied from the in-bound channel frequency controller 407. The transmitter 413 transmits the modulated multiplexed signal on the in-bound channel having newly set frequency through the MPX 404, the ODU 403 and the antenna 402 to the HUB 300 as the in-bound signal.

The receiver 405 sets the out-bound channel frequency to the frequency supplied from the out-bound frequency controller 408 and receives the out-bound signal having the newly set frequency among out-bound signals received through the antenna 402, the out door unit (ODU) 403 and the multiplexer (MPX) 404.

The MPX 404 selectively outputs the out-bound signal from the ODU 403 to the receiver 405 and selectively outputs the signal from the transmitter 413 to the ODU 404.

Now, the operation of this embodiment will be described with reference to the drawings.

First, the operation in a case where the traffic of the satellite communication channels is normal will be described.

Figure 4A:
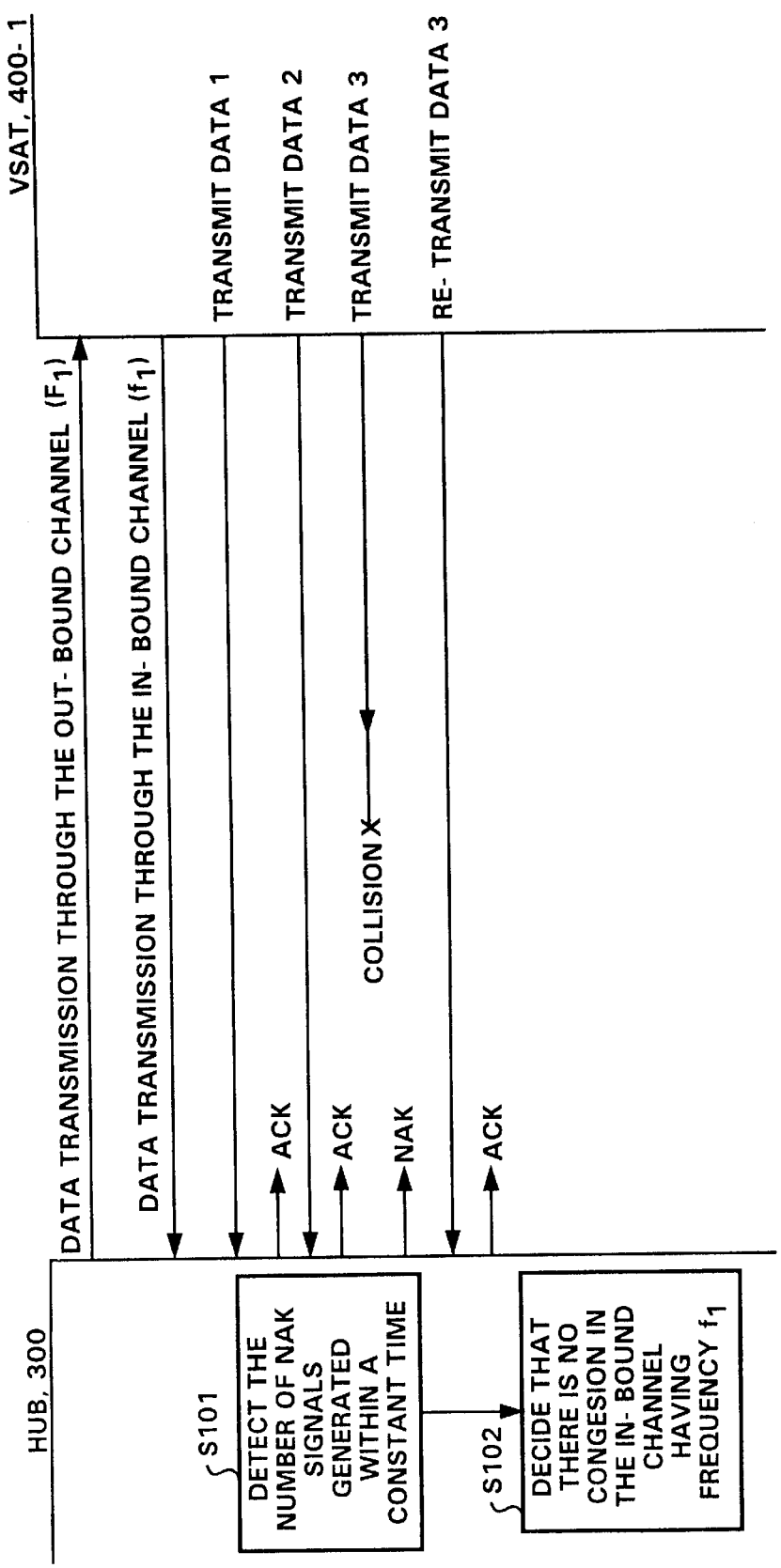
FIG. 4A is a diagram showing an operation of the satellite communication system of the present invention when a traffic on the in-bound channel is normal.

Referring to FIGS. 1 and 4A, the VSAT's 400-1 to 400-4 which belong to a group G1A transmit data in time division multiple access (TDMA) to only the HUB 300 through an in-bound channel 501 having frequency f1. The VSAT's 400-5 to 400-8 which belong to a group G2A transmit data in TDMA to only the HUB 300 through an in-bound channel 501 having frequency f2 and the VSAT's 400-9 to 400-12 which belong to a group G3A transmit data in TDMA to only the HUB 300 through an in-bound channel 501 having frequency f3. On the other hand, HUB 300 transmits an identical data to all of the VSAT's 400-1 to 400-12 through the out-bound channel 502 having frequency of F1. It is assumed here that the VSAT 400-1 transmits data 1, data 2 and data 3 to the HUB 300 through the in-bound channel 501 having frequency f1 sequentially. In FIG. 4A, it is assumed that the HUB 300 can receive the data 1 and data 2 normally and can not receive the data 3 normally due to collision with other data from other VSAT's. In such case, the HUB 300 sends ACK signals for the respective data 1 and 2 back to the VSAT 400-1 and sends an NAK signal for the data 3 to the VSAT 400-1. In response to the NAK signal from the HUB 300, the VSAT 400-1 re-transmits the data 3 to the HUB 300. The HUB 300 transmits an ACK signal to the VSAT 400-1 when it receives the re-transmitted data 3 normally. In the HUB 300, the number of NAK signals generated within a constant time is detected (S101) and, when the detected number of NAK signals is small, it is decided that the data transmission reception can be performed smoothly with the current number of in-bound channels (S102). That is, since the number of data collisions is small, the HUB 300 decides that there is no congestion in the in-bound channel having frequency f1.

Now, the operation of this embodiment when there is the congestion in the in-bound channel will be described.

Figure 4B:
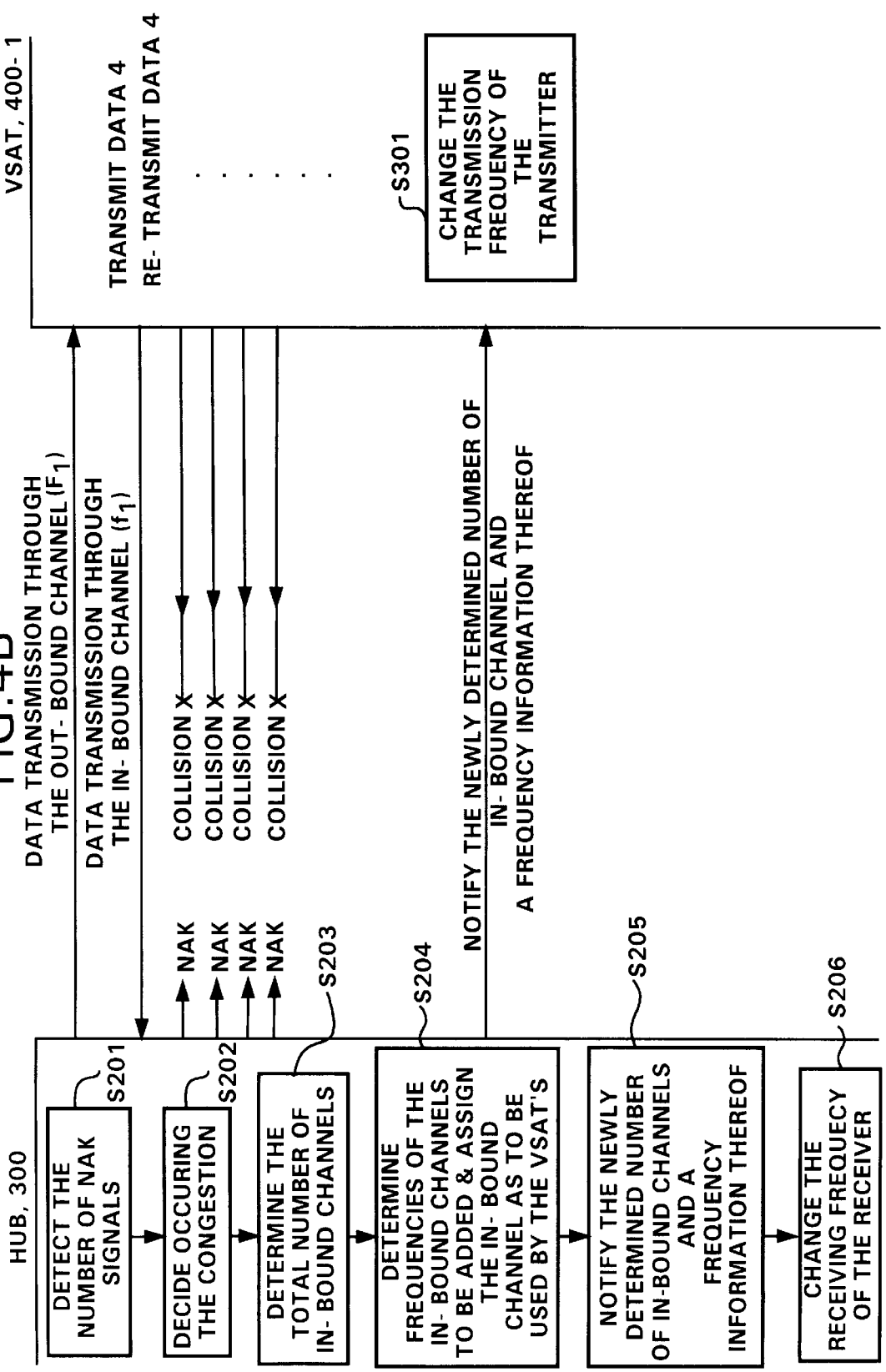
FIG. 4B is a diagram showing an operation of the satellite communication system of the present invention when there is a congestion on the in-bound channel.

Referring to FIG. 4B, the VSAT 400-1 transmits data 4 to the HUB 300. Assuming that the transmitted data 4 collides with data transmitted from other VSAT in the same time slot, the HUB 300 can not receive the data 4 normally and so it transmits an NAK signal to the VSAT 400-1. In response to the NAK signal, the VSAT 400-1 re-transmits the data 4 to the HUB 300. Assuming that the re-transmitted data 4 collides again with data transmitted from other VSAT in the same time slot, the HUB 300 can not receive the re-transmitted data 4 normally and transmits an NAK signal to the VSAT 400-1 again. This procedure shall be repeated until the HUB 300 can receive the data 4 normally, causing large communication delay to occur.

According to the present invention, the HUB 300 detects the number of NAK signals generated within a constant time (S201). Since, in this case, the number of NAK signals is large, the HUB 300 decides that the current number of in-bound channels is not enough for a smooth data communication (S202). That is, the HUB 300 decides that the congestion occurs in the in-bound channel having frequency f1. Then, the HUB 300 determines the total number of in-bound channels necessary to avoid the congestion (S203). Then, the HUB 300 determines frequencies of the in-bound channels to be added. In this example, the number of in-bound channels to be added is assumed as one and thus the frequency of the added in-bound channel is determined as f4. Thus, the HUB 300 assigns the in-bound channels having frequencies f1 to f4 as to be used by the respective VSAT's (S204). The HUB 300 notifies the newly determined number of in-bound channels and a frequency information of the in-bound channels to be used by the respective VSAT's to all of the VSAT's 400-1 to 400-12 through the out-bound channel having frequency F1 (S205). Further, the HUB 300 changes its characteristics so that it can also receive a signal transmitted through the in-bound channel having the newly set frequency f4 (S206).

All of the VSAT's 400-1 to 400-12 change the transmission frequencies to be used thereby to new frequencies, respectively, according to the notice from the HUB 300 (S301).

Incidentally, when the HUB 300 detects a congestion in the out-bound channel, the HUB 300 also notifies a newly set number of out-bound channels and a frequency information of the out-bound channels to be used by the respective VSAT's 400-1 to 400-12. In response to the notice, the VSAT's 400-1 to 400-12 change receiving frequencies to be used thereby.

Figure 5:
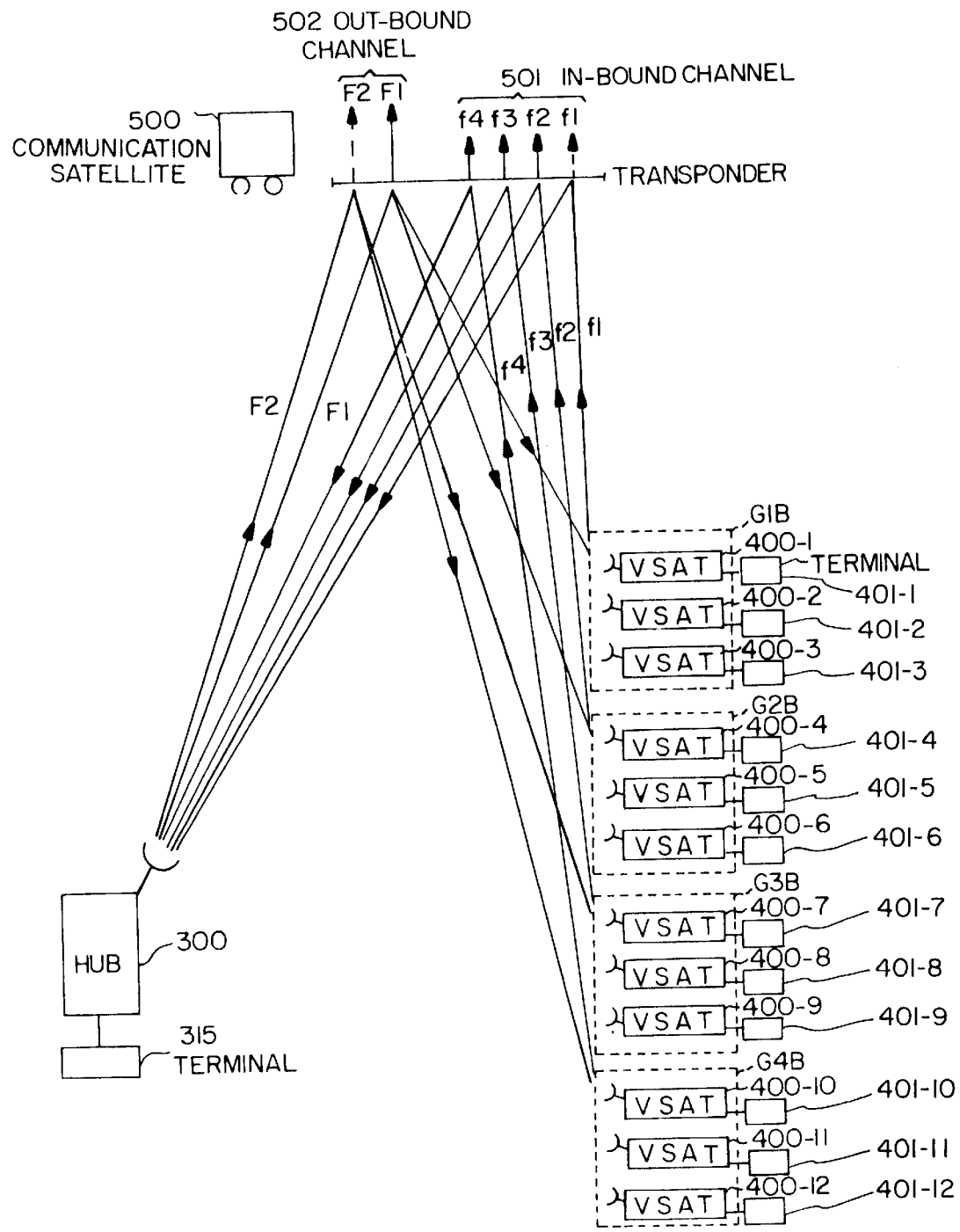
FIG. 5 shows schematically a construction of the communication system of the present invention which is the construction shown in FIG. 1 with the number of in-bound channels and out-bound channels being increased.

In an example shown in FIG. 5, in order to avoid the congestion of the satellite communication channel, the in-bound channel 501 having frequency f4 and the out-bound channel 502 having frequency F2 are newly added. That is, the VSATs 400-1 to 400-3 which belong to the group G1B use the in-bound channel 501 having frequency f1 and the out-bound channel 502 having frequency F1 and the VSAT's 400-4 to 400-6 which belong to the group G2B use the in-bound channel 501 having frequency f2 and the out-bound channel 502 having frequency F1. Further, the VSAT's 400-7 to 400-9 which belong to the group G3B use the in-bound channel 501 having frequency f3 and the out-bound channel 502 having frequency F2 and the VSAT's 400-10 to 400-12 which belong to the group G4B use the in-bound channel 501 having frequency f4 and the out-bound channel 502 having frequency F2.

Thus, the number of VSAT's which receive the out-bound signals by using one out-bound channel is reduced to ½ and the number of the VSAT's which transmit data to the HUB by using one in-bound channel is reduced to ¾. Therefore, the possibility of congestion can be substantially reduced.

Figure 6:
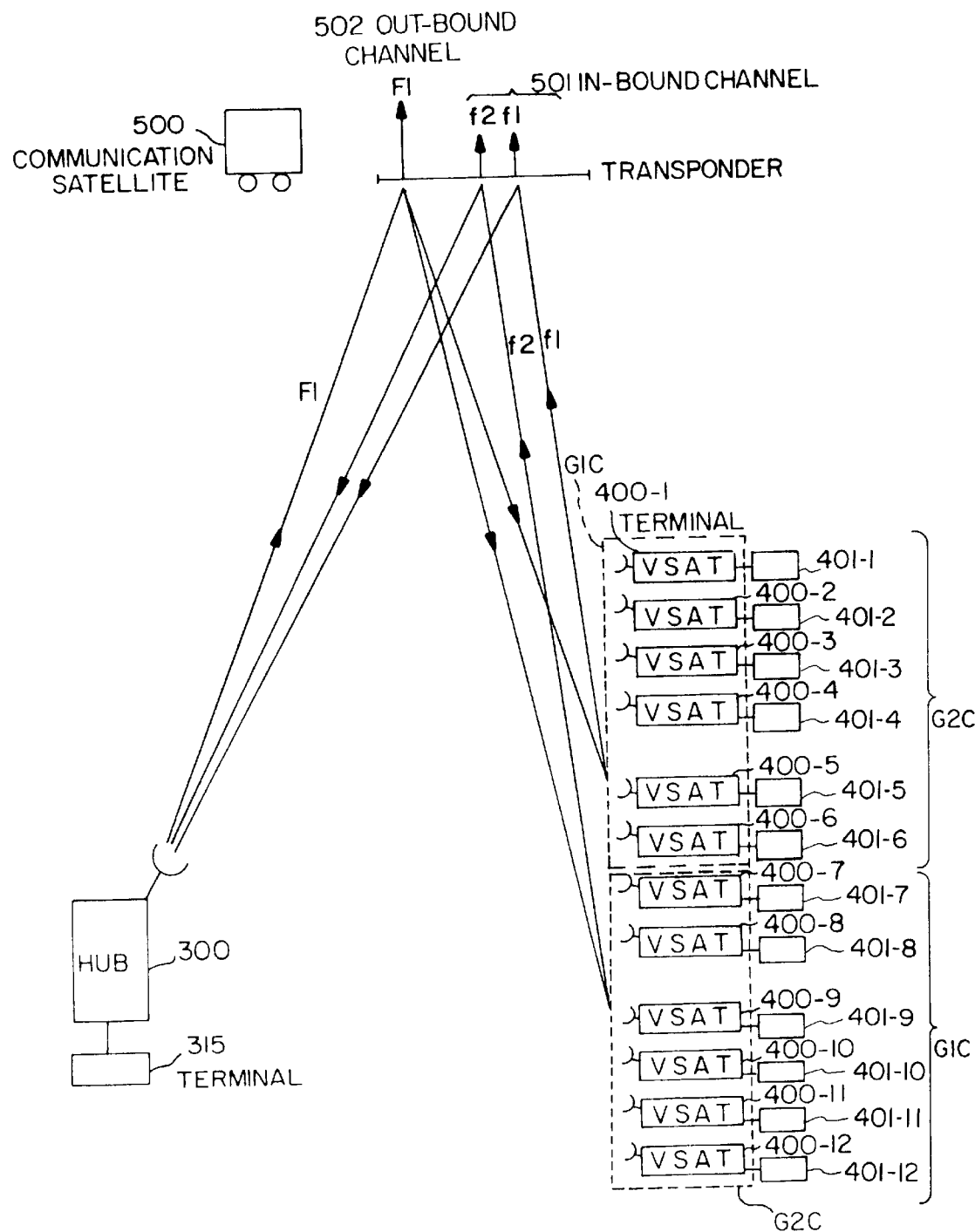
FIG. 6 shows schematically a construction of the communication system of the present invention which is the construction shown in FIG. 1 with the number of in-bound channels and out-bound channel being reduced.

In a case where the amount of communication data is substantially reduced in such as night time, the number of in-bound channels 501 is reduced to 2 channels such as shown in FIG. 6. This can be realized by changing the system such that the number of in-bound channels is changed when the HUB 300 transmits no NAK signal to the VSAT's 400-1 to 400-12 within a predetermined time, say, 10 minutes. That is, the system is changed such that the VSAT's 400-1 to 400-6 are grouped as a group G1C and use the in-bound circuit 501 having frequency f1 and the out-bound channel 502 having frequency F1 and the VSAT's 400-7 to 400-12 are grouped as a group G2C and use the in-bound channel 501 having frequency f2 and the out-bound channel 502 having frequency F1. With this scheme, it is possible to effectively utilize the frequency band of the satellite channel and power of the satellite communication in conformity with utilization time and utilization state of the satellite channel.

As described, even when the amount of data from the terminals connected to the respective VSAT's is changed substantially beyond predictable range, the satellite communication system of the present invention can respond thereto by changing the number of out-bound channels and in-bound channels which are used by the respective VSAT's. Therefore, the present satellite communication can respond to a variation of data amount flexibly.

What is claimed is:

1. A satellite communication system comprising a central station and a plurality of remote stations connected to said central station through channels, each of said remote stations adapted to transmit data to only said central station in time-division multiple access through at least one first channel and said central station being adapted to transmit same data to the plurality of said remote stations through at least one second channel;

said central station comprising:
receiving means for obtaining a first data by demodulating a signal from said remote stations;
first monitor means for monitoring an amount of the first data received by said receiving means;
first channel setting means for determining the number of said at least one first channel and frequencies of each of said at least one first channel on the basis of the monitored data amount and outputting a first control data indicative of an information of the determined number and the determined frequencies of said at least one first channel;
transmitting means for transmitting the first control data to the plurality of said remote stations;
second monitor means for monitoring an amount of the second data transmitted from at least one second terminal connected to said central station;
second channel setting means for determining the number and frequencies of said at least one second channel on the basis of the data amount monitored by said second monitor means and outputting a second control data indicative of an information of the determined number and the determined frequencies of said at least one second channel; and
multiplexing means for multiplexing the first control data, the second control data and the second data transmitted from said at least one second terminal and supplying a resultant multiplexed signal to said transmitting means;

each of said remote stations comprising:
receiving means for obtaining a second data by demodulating a signal transmitted from said central station;
separator means for separating the first control data from the second data;
transmitting means for transmitting data from a respective one of at least one first terminal, each remote station being connected to said respective first terminal, to said central station;
first channel control means for controlling said at least one first channel used by said transmitting means on the basis of the first control data separated by said separator means; and
second channel control means for controlling which of said at least one second channel is used by said receiving means on the basis of the second control data.

2. The satellite communication system as claimed in claim 1, wherein said separator means separates the multiplexed signal transmitted from said central station to the first control data, the second control data and the second data transmitted from said at least one second terminal.

3. A satellite communication system comprising a central station and a plurality of remote stations connected to said central station through channels, each of said remote stations adapted to transmit data to only said central station in time-division multiple access through at least one first channel and said central station being adapted to transmit same data to the plurality of said remote stations through at least one second channel;

said central station comprising:
receiving means for obtaining a first data by demodulating a signal from said remote stations;
first monitor means for monitoring an amount of the first data received by said receiving means;
first channel setting means for determining the number of said at least one first channel and frequencies of each of said at least one first channel on the basis of the monitored data amount and outputting a first control data indicative of an information of the determined number and the determined frequencies of said at least one first channel; and
transmitting means for transmitting the first control data to the plurality of said remote stations;

each of said remote stations comprising:
receiving means for obtaining a second data by demodulating a signal transmitted from said central station;
separator means for separating the first control data from the second data;
transmitting means for transmitting data from a respective one of at least one first terminal, each remote station being connected to said respective first terminal, to said central station; and
first channel control means for controlling said at least one first channel used by said transmitting means on the basis of the first control data separated by said separator means;

wherein said first monitor means comprises counting means for counting the number of collisions of the first data transmitted from each of said remote stations to said central station with other data in the same time slot.

4. The satellite communication system as claimed in claim 3, wherein said first monitor means comprises:
a timer circuit for outputting a reset signal every predetermined time; and
counting means for counting the number of NAK signals transmitted from said central station to said remote stations when said central station does not normally receive the first data transmitted from said remote stations to said central station between each output of the reset signal from said timer circuit.

5. A satellite communication system comprising a central station and a plurality of remote stations connected to said central station through channels, each of said remote stations adapted to transmit data to only said central station in time-division multiple access through at least one first channel and said central station being adapted to transmit same data to the plurality of said remote stations through at least one second channel;

said central station comprising:
receiving means for obtaining a first data by demodulating a signal from said remote stations;
first monitor means for monitoring an amount of the first data received by said receiving means;
first channel setting means for determining the number of said at least one first channel and frequencies of each of said at least one first channel on the basis of the monitored data amount and outputting a first control data indicative of an information of the determined number and the determined frequencies of said at least one first channel;
transmitting means for transmitting the first control data to the plurality of said remote stations; and
identification means for identifying one of said remote stations which transmits the first data, and wherein said first monitor means monitors an amount of the first data transmitted through every said first channel on the basis of a result of identification from said identification means;

each of said remote stations comprising:

receiving means for obtaining a second data by demodulating a signal transmitted from said central station;

separator means for separating the first control data from the second data;

transmitting means for transmitting data from a respective one of at least one first terminal, each remote station being connected to said respective first terminal, to said central station; and first channel control means for controlling said at least one first channel used by said transmitting means on the basis of the first control data separated by said separator means.

6. A satellite communication system comprising a central station and a plurality of remote stations connected to said central station through channels, each of said remote stations adapted to transmit data to only said central station in time-division multiple access through at least one first channel and said central station being adapted to transmit same data to the plurality of said remote stations through at least one second channel;

said central station comprising:

receiving means for obtaining a first data by demodulating a signal from said remote stations;

first monitor means for monitoring an amount of the first data received by said receiving means;

first channel setting means for determining the number of said at least one first channel and frequencies of each of said at least one first channel on the basis of the monitored data amount and outputting a first control data indicative of an information of the determined number and the determined frequencies of said at least one first channel; and transmitting means for transmitting the first control data to the plurality of said remote stations;

each of said remote stations comprising:

receiving means for obtaining a second data by demodulating a signal transmitted from said central station;

separator means for separating the first control data from the second data;

transmitting means for transmitting data from a respective one of at least one first terminal, each remote station being connected to said respective first terminal, to said central station; and first channel control means for controlling said at least one first channel used by said transmitting means on the basis of the first control data separated by said separator means;

wherein said first channel setting means comprises:

storing means for preliminarily storing the optimum number of said at least one first channel corresponding to the amount of the first data;

read means for reading out the optimum number of said at least one first channel from said storing means on the basis of the amount of the first data; and means for setting the number of said first channels thus read out from said storing means and determining frequencies of said at least one first channel.

7. In a satellite communication system including a central station and a Plurality of remote stations connected to said central station through channels, the plurality of said remote stations adapted to transmit in time-division multiple access data to said central station through at least one first channel, and said central station being adapted to transmit identical data to the plurality of said remote stations through at least one second channel; said central station comprising:

receiving means for obtaining a first data by demodulating a signal from said remote stations;

first monitor means for monitoring an amount of the first data received by said receiving means;

first channel setting means for determining the number of said at least one first channel and frequencies of each of said at least one first channel on the basis of the monitored data amount and outputting a first control data indicative of an information of the determined number and the determined frequencies of said at least one first channel;

transmitting means for transmitting the first control data to the plurality of said remote stations;

second monitor means for monitoring an amount of second data transmitted from at least one terminal connected to said central station;

second channel setting means for determining the number and frequencies of said at least one second channel on the basis of the data amount monitored by said second monitor means and outputting a second control data indicative of an information of the determined number and the determined frequencies of said at least one second channel; and multiplexing means for multiplexing the first control data, the second control data and the second data transmitted from said terminal and supplying a resultant multiplexed signal to said transmitting means.

8. In a satellite communication system including a central station and a plurality of remote stations connected to said central station through channels, the plurality of said remote stations adapted to transmit in time-division multiple access data to said central station through at least one first channel, and said central station being adapted to transmit identical data to the plurality of said remote stations through at least one second channel; said central station comprising:

receiving means for obtaining a first data by demodulating a signal from said remote stations;

first monitor means for monitoring an amount of the first data received by said receiving means;

first channel setting means for determining the number of said at least one first channel and frequencies of each of said at least one first channel on the basis of the monitored data amount and outputting a first control data indicative of an information of the determined number and the determined frequencies of said at least one first channel; and transmitting means for transmitting the first control data to the plurality of said remote stations;

wherein said first monitor means comprises counting means for counting the number of data collisions of the first data transmitted from said remote stations to said central station with other data in the same time slot in a predetermined time.

9. In a satellite communication system including a central station and a plurality of remote stations connected to said central station through channels, the plurality of said remote stations adapted to transmit in time-division multiple access data to said central station through at least one first channel, and said central station being adapted to transmit identical data to the plurality of said remote stations through at least one second channel; said central station comprising:

receiving means for obtaining a first data by demodulating a signal from said remote stations;

first monitor means for monitoring an amount of the first data received by said receiving means;

first channel setting means for determining the number of said at least one first channel and frequencies of each of said at least one first channel on the basis of the monitored data amount and outputting a first control data indicative of an information of the determined number and the determined frequencies of said at least one first channel; and transmitting means for transmitting the first control data to the Plurality of said remote stations;

wherein said first monitor means comprises:
a timer circuit for outputting a reset signal every predetermined time; and
counting means for counting the number of NAK signals transmitted from said central station to said remote stations when said central station does not normally receive the first data transmitted from said remote stations to said central station, between each output of the reset signal from said timer circuit.

10. In a satellite communication system including a central station and a plurality of remote stations connected to said central station through channels, the plurality of said remote stations adapted to transmit in time-division multiple access data to said central station through at least one first channel, and said central station being adapted to transmit identical data to the plurality of said remote stations through at least one second channel; said central station comprising:

receiving means for obtaining a first data by demodulating a signal from said remote stations;

first monitor means for monitoring an amount of the first data received by said receiving means;

first channel setting means for determining the number of said at least one first channel and frequencies of each of said at least one first channel on the basis of the monitored data amount and outputting a first control data indicative of an information of the determined number and the determined frequencies of said at least one first channel;

transmitting means for transmitting the first control data to the plurality of said remote stations; and identification means for identifying one of said remote stations which transmits the first data and wherein said first monitor means monitors an amount of the first data transmitted through every said first channel on the basis of a result of identification from said identification means.

11. In a satellite communication system including a central station and a plurality of remote stations connected to said central station through channels, the plurality of said remote stations adapted to transmit in time-division multiple access data to said central station through at least one first channel, and said central station being adapted to transmit identical data to the plurality of said remote stations through at least one second channel; each of said remote stations comprising:

receiving means for obtaining a second data by demodulating a signal transmitted from said central station;

separator means for separating the first control data from the second data;

transmitting means for transmitting data from a respective one of at least one first terminal, each remote station being connected to said respective first terminal, to said central station;

first channel control means for controlling said at least one first channel used by said transmitting means on the basis of the first control data separated by said separator means; and second channel control means for controlling which one of said at least one second channel is used by said receiving means on the basis of a second control data indicative of an information of the number of said at least one second channel and frequencies of said at least one second channel transmitted from said central station.

12. The remote station as claimed in claim 11, wherein said separator means separates the signal transmitted from said central station to the first control data, the second control data and the second data transmitted from a second terminal connected to the said central station.

13. A satellite communication system comprising a central earth station and a plurality of very small aperture terminal stations connected to said central earth station through satellite circuits, each of said very small aperture terminal stations being adapted to transmit data to only said central earth station in time-division multiple access through at least one in-bound channel, and said central station being adapted to transmit same data to the plurality of said very small aperture terminal stations through at least one out-bound channel, a plurality of first terminals being connected to respective ones of the plurality of said very small aperture terminal stations, for generating data to be transmitted in time slots of said in-bound channels by a time slot reservation system or a random access system according to length of the transmitted data;

said central earth station comprising:
receiving means for obtaining a first data by demodulating a signal from the plurality of said very small aperture terminal stations;

first monitor means for monitoring an amount of the first data received by said receiving means;

first channel setting means for determining the number of said at least one in-bound channel and frequencies of each of said at least one in-bound channel on the basis of the monitored data amount and outputting a first control data indicative of an information of the determined number and the determined frequencies of said at least one in-bound channel;

transmitting means for transmitting the first control data to the plurality of said very small aperture terminal stations;

second monitor means for monitoring an amount of the second data transmitted from at least one second terminal connected to said central earth station;

second channel setting means for determining the number and frequencies of said at least one out-bound channel on the basis of the data amount monitored by said second monitor means and outputting a second control data indicative of an information of the determined number and the determined frequencies of said at least one out-bound channel; and multiplexing means for multiplexing the first control data, the second control data and the second data transmitted from said second terminal and supplying a resultant multiplexed signal to said transmitting means, and wherein each said very small aperture terminal station further comprises second circuit control means for controlling the number of said at least one out-bound channel and frequencies of said at lest one out-bound channel used by said receiving means on the basis of the second control data;

each of said very small aperture terminal stations comprising:

receiving means for obtaining a second data by demodulating a signal transmitted from said central earth station;

separator means for separating the first control data from the second data;

transmitting means for transmitting data, from one of the plurality of first terminals respectively connected to said each of said very small aperture terminal stations, to said central earth station; and first channel control means for controlling said at least one in-bound channel used by said transmitting means and frequencies of said in-bound channels on the basis of the first control data separated by said separator means.

14. A satellite communication system as comprising a central station and a plurality of remote stations connected to said central station through channels the plurality of said remote stations being adapted to transmit data to said central station through at least one first channel of said channels, said central station being adapted to transmit identical data to the plurality of said remote stations through at least one second channel of said channels, said central station comprising:

means for detecting an amount of data transmitted from said remote stations to said central station;

means for changing the number of said at least one first channel according to the detected data amount;

means for detecting an amount of data transmitted from said central station to said remote stations; and means for changing the number of said at least one second channel according to the detected data amount.

15. A satellite communication method for use in a satellite communication system comprising a central station and a plurality of remote stations connected to said central station through satellite circuits the plurality of said remote stations being adapted to transmit data to said central station through at least one first channel, said central station being adapted to transmit identical data to the plurality of said remote stations through at least one second channel, said method comprising the steps of:

detecting an amount of data transmitted from said remote stations to said central station;

changing the number of said at least one first channel according to the detected data amount;

detecting an amount of data transmitted from said central station to said remote stations; and changing the number of said at least one second channel according to the detected amount of data transmitted from said central station to said remote stations.

16. A satellite communication method for use in a satellite communication system comprising a central station and a plurality of remote stations connected to said central station through channels the plurality of said remote stations being adapted to transmit data to said central station through at least one first channel of said channels, said central station being adapted to transmit identical data to the plurality of said remote stations through at least one second channel of said channels, said method comprising the steps of:

detecting an amount of data transmitted from said remote stations to said central station within a predetermined time;

setting the optimum number of said at least one first channel on the basis of the detected data amount;

determining frequencies of each of the thus set optimum number of at least one first channel and assigning the frequencies to respective ones of said remote stations;

transmitting data indicative of the correspondence of the frequencies of said at least one first channel to said respective remote stations, from said central station to said remote stations;

changing the transmitting frequencies of said remote stations to the assigned frequencies of said at least one first channels detecting an amount of data transmitted from said central stations to said remote stations within a predetermined time;

setting the optimum number of said at least one second channel on the basis of the detected data amount;

determining frequencies of each of said optimum number of second channels and assigning the frequencies to respective ones of said remote stations;

transmitting data indicative of the frequencies of said second channels assigned to said respective ones of said remote stations from said central station to said remote stations; and changing the receiving frequencies of said remote stations to the respective assigned frequencies of said second channels.

17. A control method for controlling a central station of a satellite communication system comprising said central station and a plurality of remote stations connected to said central station through channels, the plurality of said remote stations being adapted to transmit data to said central station through at least one first channel of said channels, said central station being adapted to transmit identical data to the plurality of said remote stations through at least one second channel of said channels, said control method comprising the steps of:

detecting an amount of data transmitted from said remote stations to said central station within a predetermined time;

setting the optimum number of said at least one first channel on the basis of the detected data amount;

determining frequencies of each of the thus set optimum number of at least one first channel and assigning the frequencies to respective ones of said remote stations;

transmitting data, from said central station to said remote stations, indicative of the frequencies of the at least one first channel assigned to said respective remote stations;

detecting an amount of data transmitted from said central station to said remote stations within a predetermined time;

setting the optimum number of said at least one second channel on the basis of the detected data amount;

determining frequencies of each of said optimum number of second channels and assigning the frequencies to respective ones of said remote stations; and transmitting data indicative of the frequencies of said second channels assigned to said respective ones of said remote stations from said central station to said remote stations.

18. A control method for controlling each of a plurality of remote stations of a satellite communication system comprising a central station and the plurality of remote stations connected to said central station through channels, the plurality of said remote stations being adapted to transmit data to said central station through at least one first channel of said channels, said central station being adapted to transmit identical data to the plurality of said remote stations through at least one second channel of said channels, said control method comprising the steps of:

separating a newly assigned first frequency data of said at least one first channel from a signal transmitted from said central station;

changing transmitting frequencies for transmitting data from said remote stations to said central station on the basis of the separated first frequency data;

separating a newly assigned second frequency data of said at least one second channel from the signal transmitted from said central station; and changing receiving frequencies for receiving data from said central station to said remote stations on the basis of the separated second frequency data.

* * * * *